United States Patent
Pillai et al.

(10) Patent No.: US 11,245,674 B2
(45) Date of Patent: Feb. 8, 2022

(54) SECURE COMMUNICATION PROTOCOL PROCESSING

(71) Applicant: Nicira, Inc., Palo Alto, CA (US)

(72) Inventors: Sanal Pillai, Palo Alto, CA (US); Daniel Wing, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 133 days.

(21) Appl. No.: 15/841,297

(22) Filed: Dec. 14, 2017

(65) Prior Publication Data

US 2019/0190891 A1  Jun. 20, 2019

(51) Int. Cl.
  *H04L 29/06*  (2006.01)
  *H04L 9/30*   (2006.01)
  *H04L 9/14*   (2006.01)
  *H04L 9/32*   (2006.01)

(52) U.S. Cl.
  CPC .......... *H04L 63/0428* (2013.01); *H04L 9/14* (2013.01); *H04L 9/30* (2013.01); *H04L 9/3226* (2013.01); *H04L 63/08* (2013.01)

(58) Field of Classification Search
  CPC ......... H04L 9/30; H04L 9/14; H04L 63/0428; H04L 9/3226
  See application file for complete search history.

(56) References Cited

U.S. PATENT DOCUMENTS

| | | | | |
|---|---|---|---|---|
| 8,819,512 B1 * | 8/2014 | Wang | .................. | H04L 1/08 714/748 |
| 9,094,348 B2 * | 7/2015 | Tzannes | ................ | H04L 45/72 |
| 9,456,002 B2 * | 9/2016 | Kelson | ................ | H04L 63/0281 |
| 2003/0072286 A1 * | 4/2003 | Kim | .................. | H04L 1/0066 370/335 |
| 2005/0068908 A1 * | 3/2005 | Qian | .................. | H04L 1/1671 370/278 |
| 2005/0141522 A1 * | 6/2005 | Kadar | ................ | H04L 51/38 370/396 |
| 2006/0233200 A1 * | 10/2006 | Fifield | .................. | H04L 1/188 370/473 |

(Continued)

OTHER PUBLICATIONS

"Why do new versions of TLS use an explicit IV for CBC suites?", Aug. 30, 2016, "crypto.stackexchange.com". (Year: 2016).*

(Continued)

*Primary Examiner* — Tongoc Tran
(74) *Attorney, Agent, or Firm* — Su IP Consulting (57) ABSTRACT

Example methods are provided for secure communication protocol processing in a network environment. The method may comprise, in response to detecting a first transport protocol packet that is addressed from a first endpoint to a second endpoint and includes unencrypted payload data and a first sequence number, generating and sending a first secure communication protocol packet that includes encrypted payload data and a second sequence number. The method may also comprise, in response detecting a second transport protocol packet that includes the first sequence number, determining that the second transport protocol packet is a retransmission of the first transport protocol packet. The method may further comprise generating and sending a second secure communication protocol packet that includes the second sequence number associated with the first sequence number.

18 Claims, 8 Drawing Sheets

(56) References Cited

U.S. PATENT DOCUMENTS

| | | | | |
|---|---|---|---|---|
| 2009/0300450 | A1* | 12/2009 | Tzannes | H04L 12/5601 |
| | | | | 714/748 |
| 2010/0302955 | A1* | 12/2010 | Bhatnagar | H04L 29/08 |
| | | | | 370/252 |
| 2014/0126468 | A1* | 5/2014 | Filgueiras | H04L 1/1845 |
| | | | | 370/328 |
| 2014/0337614 | A1* | 11/2014 | Kelson | H04L 63/20 |
| | | | | 713/152 |
| 2015/0172884 | A1* | 6/2015 | Arazi | H04L 51/38 |
| | | | | 455/466 |
| 2015/0381578 | A1* | 12/2015 | Thota | H04L 63/1408 |
| | | | | 713/168 |
| 2016/0219420 | A1* | 7/2016 | Sah | H04W 4/14 |
| 2016/0308764 | A1* | 10/2016 | Le | H04L 45/742 |
| 2017/0149675 | A1* | 5/2017 | Yang | H04L 43/0835 |
| 2018/0184416 | A1* | 6/2018 | Leroux | H04L 67/02 |
| 2018/0375644 | A1* | 12/2018 | Karagiannis | H04L 63/0281 |
| 2019/0058793 | A1* | 2/2019 | Konig | H04M 3/5175 |

OTHER PUBLICATIONS

Randall Stewart et al., "Improving High-Bandwidth TLS in the FreeBSD Kernel", Retrieved on Dec. 23, 2017 from the URL at <https://people.freebsd.org/~rrs/asiabsd_tls_improved.pdf>.

Randall Stewart et al., "Optimizing TLS for High-Bandwidth Applications in FreeBSD," Mar. 2015, Retrieved from the URL at <https://peoplefreebsd.org/~rrs/asiabsd 2015 tls.pdf>.

"Linux Kernel TLS/DTLS Socket", Retrieved on Dec. 23, 2017 from the URL at <https://github.com/ktls/af_ktls>.

* cited by examiner

SECURE COMMUNICATION PROTOCOL PROCESSING

BACKGROUND

Unless otherwise indicated herein, the approaches described in this section are not admitted to be prior art by inclusion in this section.

Communications networks are generally packet-switched networks that operate based on Internet Protocol (IP). When one endpoint (e.g., host) has data to send to another endpoint, the data may be transmitted as a series of packets. Transmission Control Protocol (TCP) is a transport protocol that offers reliable data transfer between endpoints through acknowledgement and retransmission mechanisms. Further, using secure communication protocols such as Transport Layer Security (TLS), data transfer between endpoints may be performed in a secure manner. This way, the likelihood of unauthorized access or eavesdropping by malicious third parties may be reduced. However, in practice, secure communication protocol processing may not be performed in an efficient manner, which may adversely affect performance.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to secure communication protocol processing will now be explained in more detail using FIG. 1, which is a schematic diagram illustrating example network environment 100 in which secure communication protocol processing may be performed. It should be understood that, depending on the desired implementation, network environment 100 may include additional and/or alternative components than that shown in FIG. 1. Although described using a virtualized computing environment, it should be understood that examples of the present disclosure may be implemented in any suitable network environment that includes communicating endpoints.

Figure 1:
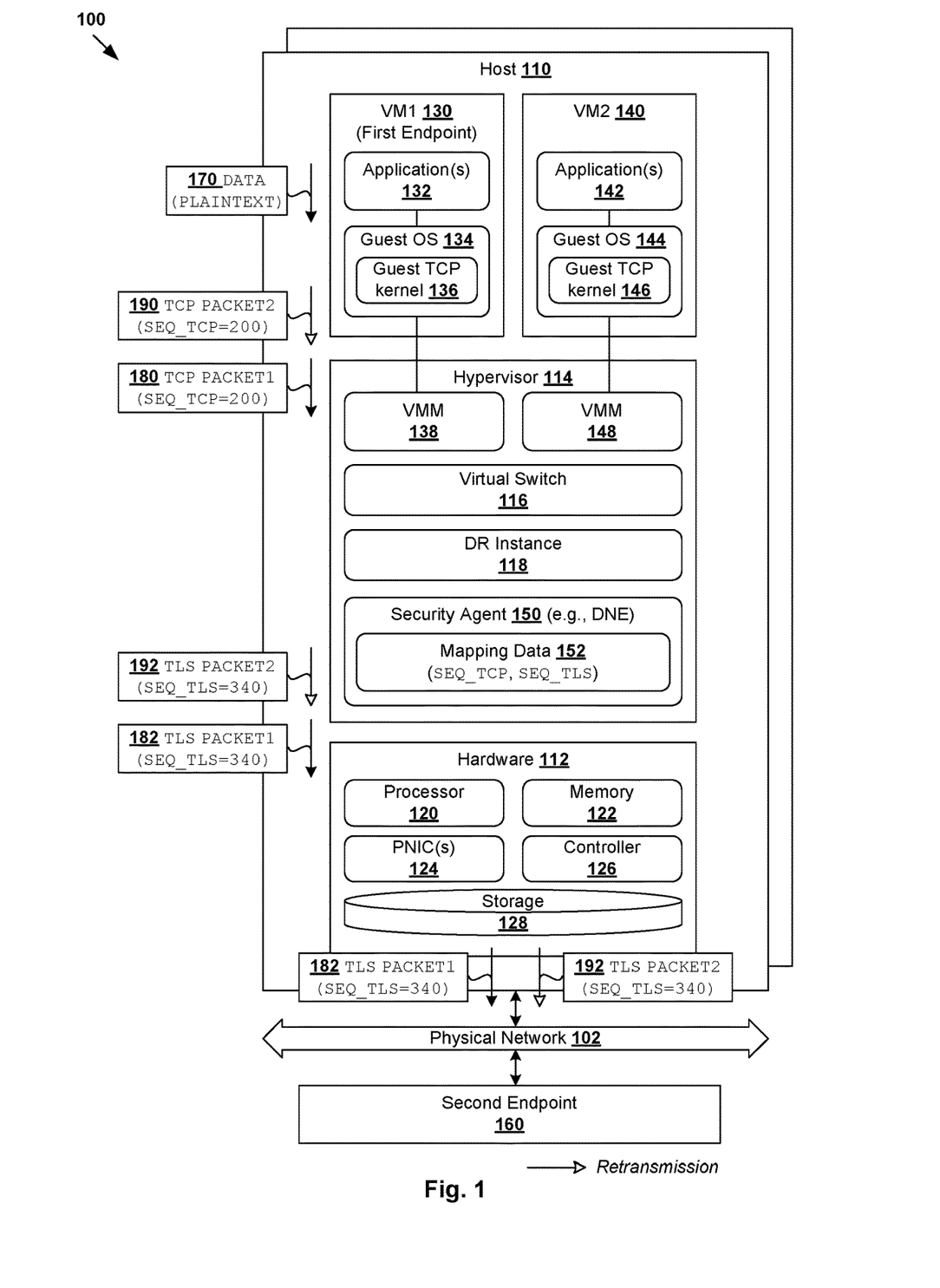
FIG. 1 is a schematic diagram illustrating an example network environment in which secure communication protocol processing may be performed.

In the example in FIG. 1, network environment 100 is in the form of a virtualized computing environment that includes multiple hosts 110 (one shown in detail for simplicity) connected via physical network 102. Each host 110 (also known as "computing device," "host computer," "host devices," "physical servers," "server systems," etc.) includes hardware 112 and virtualization software (e.g., hypervisor 114) to support multiple guest virtual machines, such as VM1 130 and VM2 140. Throughout the present disclosure, the term "hypervisor" may refer to any suitable computer hardware virtualization software that enables multiple virtual machines to execute simultaneously on a single host, such as VMware ESX® (available from VMware, Inc.). In practice, each host 110 may support tens or hundreds of virtual machines.

Hypervisor 114 maintains a mapping between underlying hardware 112 and virtual resources allocated to virtual machines 130, 140. For example, hardware 112 includes processor(s) 120, physical memory 122, physical network interface controller(s) or PNIC(s) 124 to provide access to physical network 102, and storage disk(s) 128 (e.g., solid state drive, hard disk drive) accessible via storage controller 126, etc. In practice, hypervisor 114 may also be a "type 2" or hosted hypervisor that runs on top of a conventional operating system (OS) on host 110. The term "hypervisor" may also include system-level software that supports namespace containers, (e.g., Docker, Inc., etc.).

VM1 130 and VM2 140 each represent a software implementation of a physical machine. Virtual resources are allocated to virtual machine 130/140 to support guest OS 134/144, and guest application(s) 132/142, etc. Corresponding to hardware 112, the virtual resources may include virtual CPU, virtual memory, virtual disk, virtual network interface controller (vNIC), etc. Hardware resources may be emulated using virtual machine monitor (VMM) 136/146 implemented by hypervisor 114. In practice, VMM 136/146 may be considered as part of virtual machine 130/140, or alternatively, separated from the virtual machine. Hypervisor 114 also implements virtual switch 116 and logical distributed router (DR) instance 118 to handle egress packets from, and ingress packets to, virtual machine 130/140. Depending on the desired implementation, virtual switch 116 and DR instance 118 may be configured to implement logical layer-2 switches (e.g., using a forwarding table) and/or logical layer-3 routers (e.g., using a routing table) that each span multiple hosts 110.

Although examples of the present disclosure refer to virtual machines, it should be understood that a "virtual machine" running on host 110 is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host OS without the need for a hypervisor or separate OS or implemented as an OS level virtualization), virtual private servers, client computers, etc. Such container technology is available from, among others, Docker, Inc. The virtual machines may also be complete computational environments, containing virtual equivalents of the hardware and software components of a physical computing system. The term "layer-2" generally refers to a Media Access Control (MAC) layer, "layer-3" to a network layer and "layer-4" to a transport layer in the Open System Interconnection (OSI) model, although the concepts described herein may be applicable to other networking models.

Through software-defined networking (SDN), benefits similar to server virtualization may be derived for networking services. For example, network management entities (e.g., SDN manager and/or SDN controller; not shown for simplicity) may be deployed in network environment 100 various to implement virtualization technologies (e.g., logical overlay networks, logical switches, logical routers, etc.). One example of an SDN controller is the NSX controller component of VMware NSX® (available from VMware, Inc.) that operates on a central control plane. The SDN controller may be a member of a controller cluster (not shown) that is configurable using the SDN manager operating on a management plane. Each network management entity may be implemented using physical machine(s), virtual machine(s), or both. The SDN controller may implement a central control plane (CCP) module to interact with a local control plane (LCP) agent on host 110 for collecting and disseminating control information, etc.

In virtualized computing environment 100, secure communication protocols may be implemented for extended security. For example, Transport Layer Security (TLS) operates over a transport protocol such as Transmission Control Protocol (TCP) to facilitate secure data transfer from a first endpoint (e.g., VM1 130) and second endpoint 160 over physical network 102. Plaintext or unencrypted payload data in a TCP packet will be encrypted to generate TLS packet with encrypted payload data. Security information for encryption and decryption (e.g., public key, private key, SSL certificate, etc.) may be exchanged when a TLS session is established between endpoints 130, 160.

Transport protocols such as TCP facilitate reliable data transfer using sequence numbering, acknowledgement and retransmission. One way TCP provides reliability is for each endpoint to acknowledge the packets it receives from another endpoint. In practice, however, data packets or their acknowledgements may be lost or dropped due to the unreliable nature of the underlying physical network 102. Conventionally, to facilitate packet retransmission during a secure data transfer, it is necessary for first endpoint 130 (e.g., using application 132) to store a copy of encrypted data that has been sent, but not yet acknowledged. If the encrypted data is not acknowledged before a timeout period expires, the copy will be retransmitted. Such conventional approaches are generally inefficient and require relatively high memory consumption, especially during a large data transfer.

Secure Communication Protocol Processing

According to examples of the present disclosure, secure communication protocol processing may be improved using security agent 150. As will be discussed below, it is not necessary for security agent 150 to store any encrypted payload data that has been sent, but not acknowledged. Instead, security agent 150 may maintain mapping data 152 (to be discussed below) to facilitate packet retransmission. Since it is not necessary to store encrypted data for retransmission purposes, secure communication protocol processing may be performed in more memory-efficient manner, such as with reduced kernel state or memory. In the example in FIG. 1, guest TCP kernel 136 may perform its own congestion control, acknowledgement and retransmission mechanisms. Security agent 150, which is implemented outside of application 132, does not have to terminate and re-originate TCP connections.

As used herein, the term "security agent" may refer generally to any software-implemented component and/or physical component (or set of components) of a physical host or physical network device that is capable of performing secure communication protocol processing according to examples of the present disclosure. For example in FIG. 1, security agent 150 may also be referred to as a distributed network encryption (DNE) module or kernel module. The term "endpoint" may refer generally to an originating or terminating node of a bi-directional inter-process communication flow of packet(s).

In the following, TLS and TCP will be used as examples. Besides TLS, any alternative/additional "secure communication protocol" may be used, such as Secure Sockets Layer (SSL), Datagram Transport Layer Security (DTLS), etc. Besides TCP, any alternative/additional suitable "transport protocol" (also known as "transport layer" or layer-4 protocol) may be used, such as TCP, Stream Control Transmission Protocol (SCTP), Datagram Congestion Control Protocol (DCCP), Quick User Datagram Protocol (UDP) Internet Connections (QUIC), etc. The term "secure communication protocol packet" may refer generally to a packet generated, at least in part, according to a secure communication protocol (e.g., TLS packet includes a TLS header, encrypted payload data and authentication tag). The term "transport protocol packet" may refer generally to a packet generated, at least in part, according to a transport protocol (e.g., TCP packet includes a TCP header). The term "packets" may refer generally to a group of bits that can be transported together, and may be in another form, such as "frames", "messages", "segments", "records," etc.

Figure 2:
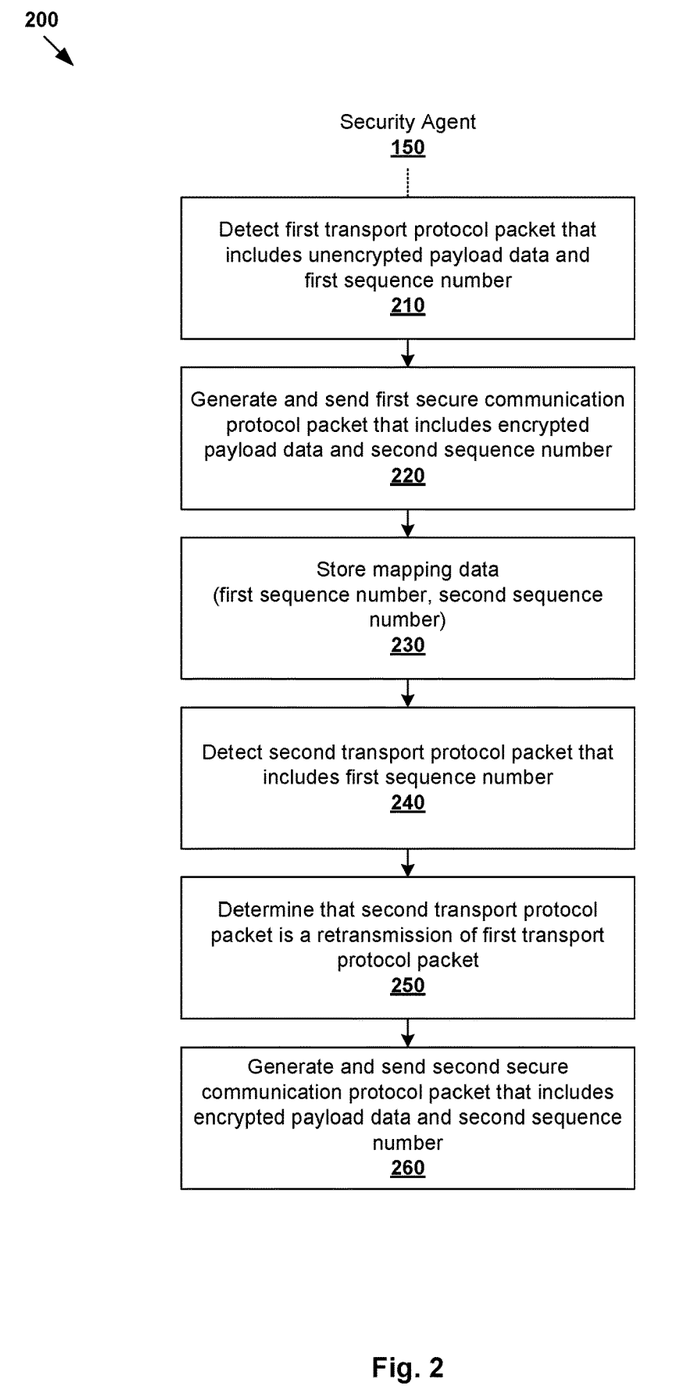
FIG. 2 is a flowchart of an example process for a security agent to perform secure communication protocol processing in a network environment.

In more detail, FIG. 2 is a flowchart of example process 200 for security agent 150 to perform secure communication protocol processing in network environment 100. Example process 200 may include one or more operations, functions, or actions illustrated by one or more blocks, such as 210 to 260. The various blocks may be combined into fewer blocks, divided into additional blocks, and/or eliminated depending on the desired implementation. The example in FIG. 2 will be discussed using FIG. 1.

At 210 and 220 in FIG. 2, in response to detecting first TCP packet 180 ("first transport protocol packet"), security agent 150 generates and sends first TLS packet 182 ("first secure communication protocol packet") based on first TCP packet 180. For example in FIG. 1, first TCP packet 180 is addressed from first endpoint 130 to second endpoint 160, and includes unencrypted payload data (e.g., plaintext data 170 from application 132) and SEQ_TCP=200 ("first sequence number"). First TLS packet 182 includes encrypted payload data and SEQ_TLS=340 ("second sequence number").

At 230 in FIG. 2, security agent 150 stores storing mapping data 152 that associates the first sequence number with the second sequence number, such as (SEQ_TCP=200, SEQ_TLS=340). In practice, mapping data 152 maintained by security agent 150 may represent a dynamic table of sequence number mappings between transport protocol packets and secure communication protocol packets. Since it is not necessary for security agent 150 to store any encrypted data for packet retransmission purposes, the size of kernel state/memory may be reduced At 240 and 250 in FIG. 2, in response detecting second TCP packet 190 ("second transport protocol packet") that includes SEQ_TCP=200, security agent 150 determines that second TCP packet 190 is a retransmission of first TCP packet 180. Also, at 260 in FIG. 2, security agent 150 generates and sends second TLS packet 192 ("second secure communication protocol packet") based on second TCP packet 190. Second TLS packet 192 includes SEQ_TLS=340 associated with SEQ_TCP=200 in mapping data 152. Second TLS packet 192 may be forwarded to second endpoint 160 via physical network 102.

As will be discussed further using FIG. 3, FIG. 4 and FIG. 5, first TLS packet 182 and second TLS packet 192 may be generated based on the same encryption initialization vector or different vectors. For example, the unencrypted payload data in first TCP packet 180 may be encrypted using a first encryption initialization vector (IV1) to generate the encrypted payload data in first TLS packet 182 at block 220. The unencrypted payload data in second TCP packet 190 may be encrypted using a second encryption initialization vector (IV2) to generate the encrypted payload data in second TLS packet 192, where IV2≠IV1.

Further, security agent 150 may map SEQ_TCP in first TCP packet 180 to SEQ_TLS in first TLS packet 182 based on an offset value associated with one or more of the following: size of a secure communication protocol header (e.g., TLS header) in first TLS packet 182, size of an authentication tag in first TLS packet 182 and data padding in first TLS packet 182. Mapping data 152 may be used to track data that has been sent, but not acknowledged by second endpoint 160. As will be discussed further using FIG. 3, FIG. 4 and FIG. 5, in response to detecting an acknowledgement packet for second TLS packet 192 from second endpoint 160, security agent 150 generates and sends an acknowledgement packet for second TCP packet 190 based on mapping data 192.

According to examples of the present disclosure, security agent 150 may be implemented at any suitable point along a data path between first endpoint 130 (particularly after application 132 and guest TCP kernel 136) and second endpoint 160. For example, security agent 150 may be implemented "underneath" guest OS 134 of VM1 130, such as by hypervisor 114 (as shown in FIG. 1) of host 110 supporting VM1 130, physical NIC 124 of host 110 supporting VM1 130 (to be discussed using FIG. 7), a network device connecting host 110 with second endpoint 160 (to be discussed using FIG. 8), etc. In another example, according to an "in-kernel" approach, security agent 150 may be implemented by guest OS 134 (e.g., kernel space) of VM1 130 (to be discussed using FIG. 6).

Detailed Process

Figure 3:
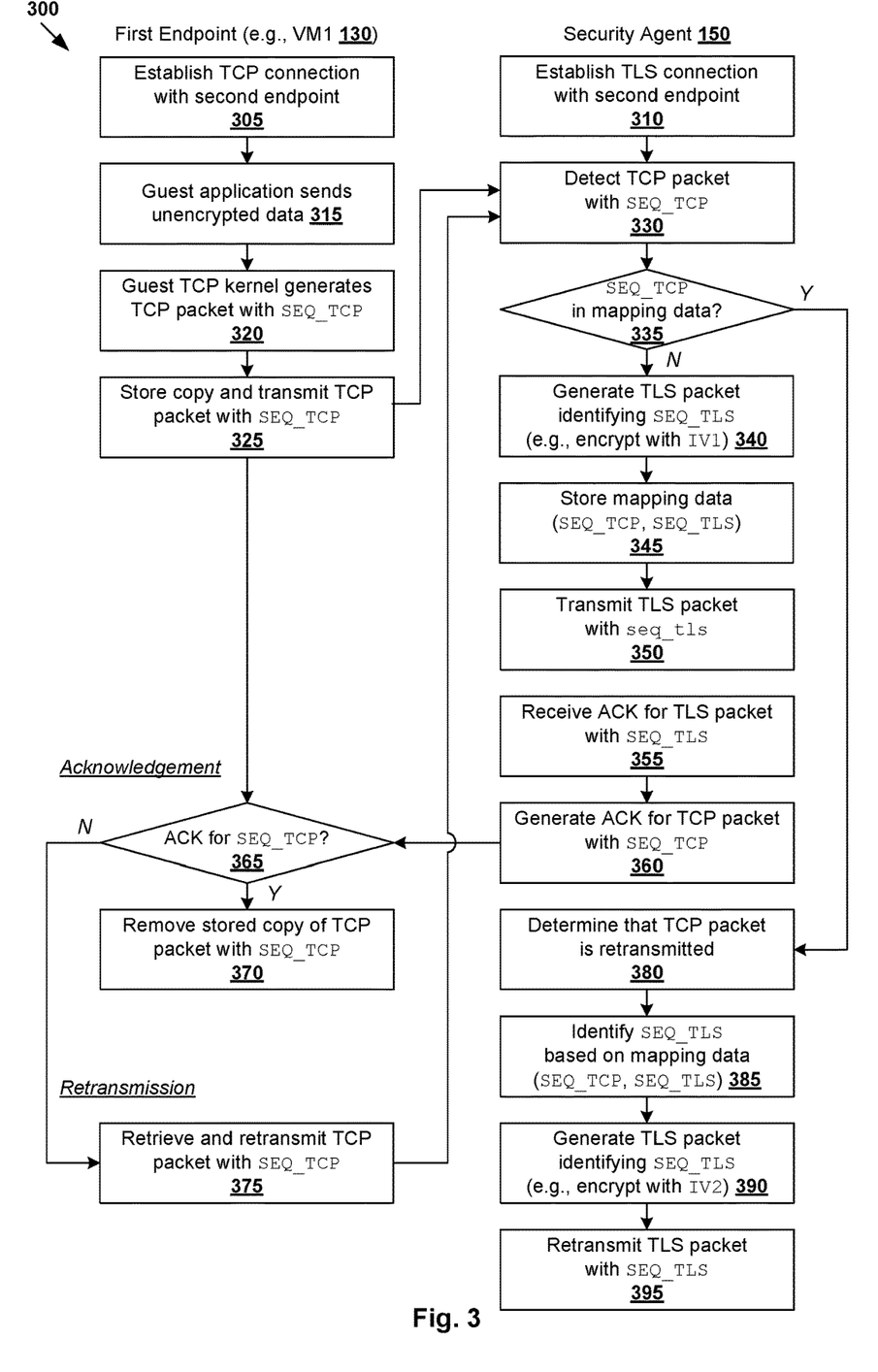
FIG. 3 is a flowchart of an example detailed process for secure communication protocol processing in a network environment.

FIG. 3 is a flowchart of example detailed process 300 for secure communication protocol processing in network environment 100. Example process 300 may include one or more operations, functions, or actions illustrated by one or more blocks, such as 305 to 395. The various blocks may be combined into fewer blocks, divided into additional blocks, and/or eliminated depending on the desired implementation. The example in FIG. 3 will be discussed using FIG. 4, which is a schematic diagram illustrating example mapping between transport protocol packets and secure communication protocol packets.

At 305 in FIG. 3, a first endpoint in the form of VM1 130 on host 110 establishes a transport protocol connection with second endpoint 160 over physical network 102. For example, a TCP connection may be established using a three-way handshake process. This may involve VM1 130 initiating the connection establishment process by sending a synchronization (SYN) packet to second endpoint 160, which then responds with a synchronization-acknowledgment (SYN-ACK) packet. VM1 130 then responds with an acknowledgement (ACK) packet to complete the connection establishment process.

At 310 in FIG. 3, security agent 150 establishes a secure connection with second endpoint 160 on behalf of VM1 130. For example, to establish a TLS connection, VM1 130 may initiate a TLS handshake process that allows endpoints 130, 160 to authenticate each other and negotiate secure connection parameters. In particular, VM1 130 may send a 'ClientHello' message to second endpoint 160, which responds with a 'ServerHello' message during a negotiation phase. The 'ClientHello' message generally specifies the highest protocol version VM1 130 supports, a random number, a list of suggested cipher suites and suggested compression methods. The 'ServerHello' generally specifies the protocol version selected by second endpoint 160, a random number, as well as a cipher suite and a compression method selected from the list suggested by VM1 130. Next, second endpoint 160 sends a 'Certificate' message, 'ServerKeyExchange' message and 'ServerHelloDone' message to VM1 130, which responds with a 'ClientKeyExchange' message. The TLS handshake process is completed by VM1 130 and second endpoint 160 exchanging a 'ChangeCipherSpec' message and an authenticated and encrypted 'Finished' message with each other.

At 315 and 320 in FIG. 3, in response to detecting unencrypted (i.e., plaintext) data generated and sent by guest application 132, guest OS 134 (e.g., using guest TCP kernel 136) generates a TCP packet. For example in FIG. 4, first TCP packet 410 is generated by encapsulating unencrypted payload data sent by guest application 132 with header data that includes a MAC header, an IP header and a TCP header.

Referring to first TCP packet 410, the TCP header includes various fields (not all shown for simplicity), including a port number (e.g., 80 for HyperText Transfer Protocol (HTTP)) and a TCP sequence number (denoted as "SEQ_TCP") that keeps track of how much data has been sent. For example, SEQ_TCP=100 is set based on size=100 of the unencrypted payload data. The IP header includes a source IP address (e.g., IP-1) associated with VM1 130 and a destination IP address (e.g., IP-2) associated with second endpoint 160. The MAC header includes a source MAC address (e.g., MAC-1) associated with VM1 130 and a destination MAC address (e.g., MAC-2) associated with second endpoint 160.

At 330 and 335 in FIG. 3, in response to detecting first TCP packet 410 from VM1 130, security agent 150 determines whether SEQ_TCP=100 can be found in mapping data 152 maintained by security agent 150. The purpose is to determine whether the TCP packet is a retransmitted packet. If yes (i.e., retransmission), security layer 150 proceeds to blocks 365-380 but otherwise (i.e., first transmission), blocks 340-350 are performed.

At 340 in FIG. 3, security agent 150 performs TLS processing to generate first TLS packet 412 based on first TCP packet 410. This may involve security agent 150 encrypting the unencrypted payload data in first TCP packet 410 to generate encrypted payload data in first TLS packet 420. The encryption may be based on a first encryption initialization vector (IV1), which is an arbitrary number (e.g., 8 bytes) that can be used along with a secret key for data encryption. The TLS processing may further involve security agent 150 modifying port number=80 in first TCP packet 410 to port number=443 associated HTTP over TLS service and appending or tagging TLS packet 420 with an authentication tag (see "AUTH") for second endpoint 160 to verify the data integrity of TLS packet 420. In practice, any alternative/additional processing may be performed, such as data compression, etc.

Further, SEQ_TCP=100 is modified to a TLS sequence number (see "SEQ_TLS"). In practice, SEQ_TLS may be calculated based on an OFFSET value that depends on the TLS handshake process at block 310. The OFFSET value represents the TLS overhead, which depends on the size of TLS header 423, size of an authentication tag (see "AUTH") in TLS packet 420, and size of data padding (e.g., 0-255 bytes, but usually 0-16 bytes) in TLS packet 420. In the example in FIG. 4, OFFSET=20. For first TCP packet 410 and TLS packet 420, SEQ_TLS=SEQ_TCP+20=100+20=120. Similar to TCP packet 410, TLS packet 420 also includes a MAC header and IP header.

At 345 and 350 in FIG. 3, security agent 150 stores mapping data (see 152) that associates SEQ_TCP=100 in TCP packet 410 with SEQ_TLS=120 in TLS packet 420, before sending TLS packet 420 over physical network 102 to second endpoint 160. As more TCP packets and TLS packets are generated and sent, SEQ_TCP and SEQ_TLS are incremented to keep track of the respective unencrypted and encrypted data sent. In this case, mapping data 152 may be updated to store corresponding (SEQ_TCP, SEQ_TLS) mappings.

Figure 4:
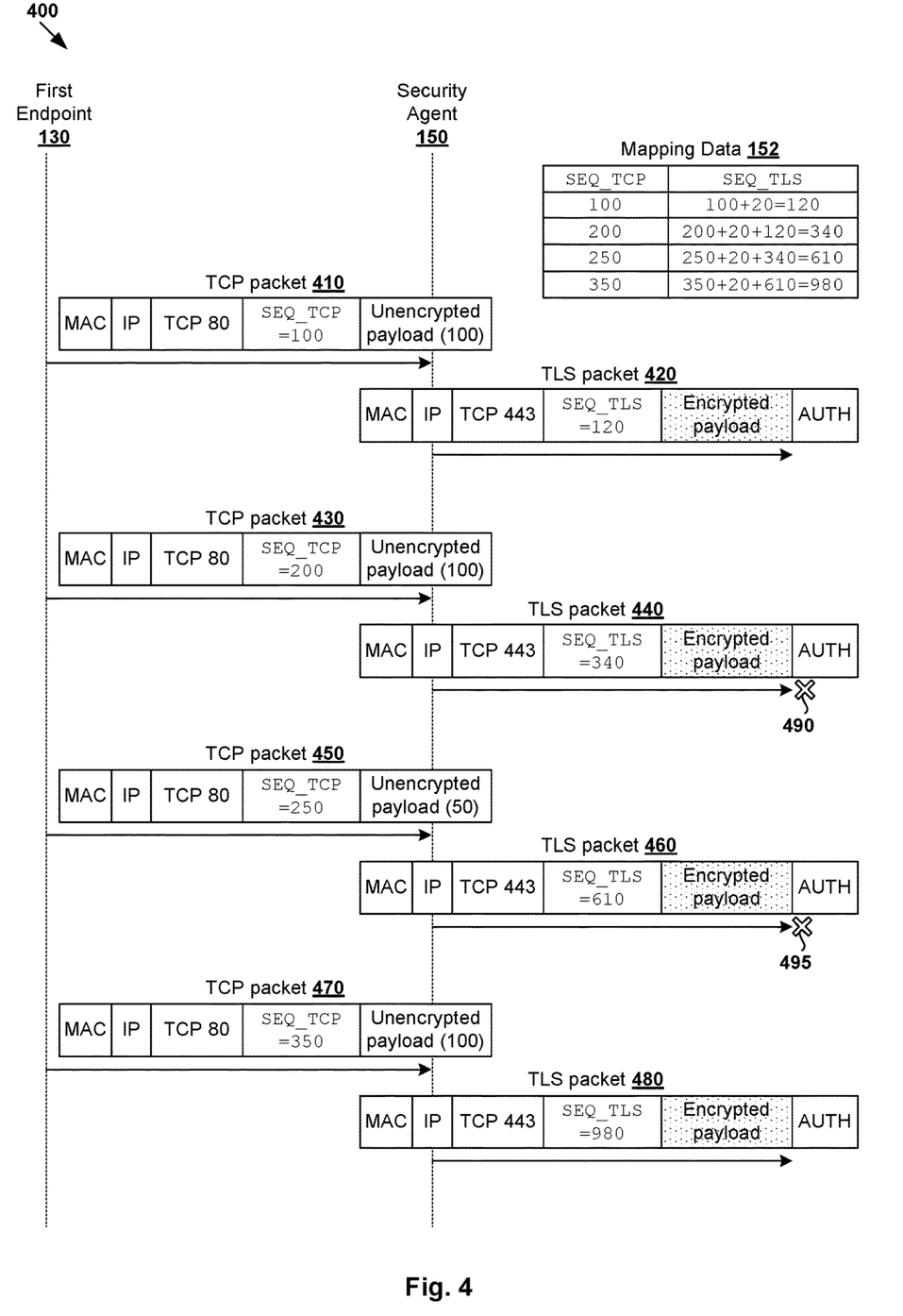
FIG. 4 is a schematic diagram illustrating example mapping between transport protocol packets and secure communication protocol packets.

In the example in FIG. 4, second TLS packet 440 may be generated and sent based on second TCP packet 430 with unencrypted payload size=100 and SEQ_TCP=200. In this case, second TLS packet 460 is generated to include encrypted payload data and SEQ_TLS=SEQ_TLS+SEQ_TCP+OFFSET=120+200+20=340. Security agent 150 stores (SEQ_TCP=200, SEQ_TLS=340) in mapping data 152.

Next, third TLS packet 460 may be generated and sent based on third TCP packet 450 with unencrypted payload size=50 and SEQ_TCP=250. In this case, third TLS packet 460 is generated to include encrypted payload data and SEQ_TLS=SEQ_TLS+SEQ_TCP+OFFSET=340+250+20=610. Security agent 150 also stores (SEQ_TCP=250, SEQ_TLS=610) as part of mapping data 152.

Further, fourth TLS packet 480 may be generated and sent based on fourth TCP packet 470 with unencrypted payload size=100 and SEQ_TCP=350. Fourth TCP packet 470 is generated to include encrypted payload data and SEQ_TLS=SEQ_TLS+SEQ_TCP+OFFSET=610+350+20=980. Security agent 150 also stores (SEQ_TCP=350, SEQ_TLS=980) as part of mapping data 152.

Although a one-to-one mapping between a TCP packet and a TLS packet is shown in FIG. 4, it should be understood that any alternative and/or additional approach may be used. For example, unencrypted payload data from multiple TCP packets may be combined and encrypted to generate a larger TLS packet. In another example, a large TCP packet may be fragmented into multiple fragments, based on which multiple respective TLS packets are generated. In both cases, the mapping between (SEQ_TCP, SEQ_TLS) may be adjusted accordingly. Also, to avoid or reduce the likelihood of packet fragmentation, each TLS packet may be generated to have a length that does not exceed a path maximum transmission unit (MTU) between first endpoint 130 and second endpoint.

Acknowledgement

Mapping data 152 stored at block 345 in FIG. 3 may be used by security agent 150 to keep track of TCP packets and TLS packets that have been sent for acknowledgement purposes. Referring to FIG. 3 again, at 355 and 360, in response to receiving an ACK for a TLS packet with SEQ_TLS, security agent 150 generates and sends an ACK packet for SEQ_TCP. This may involve mapping the SEQ_TLS to its associated SEQ_TCP based on mapping data 152.

Figure 5:
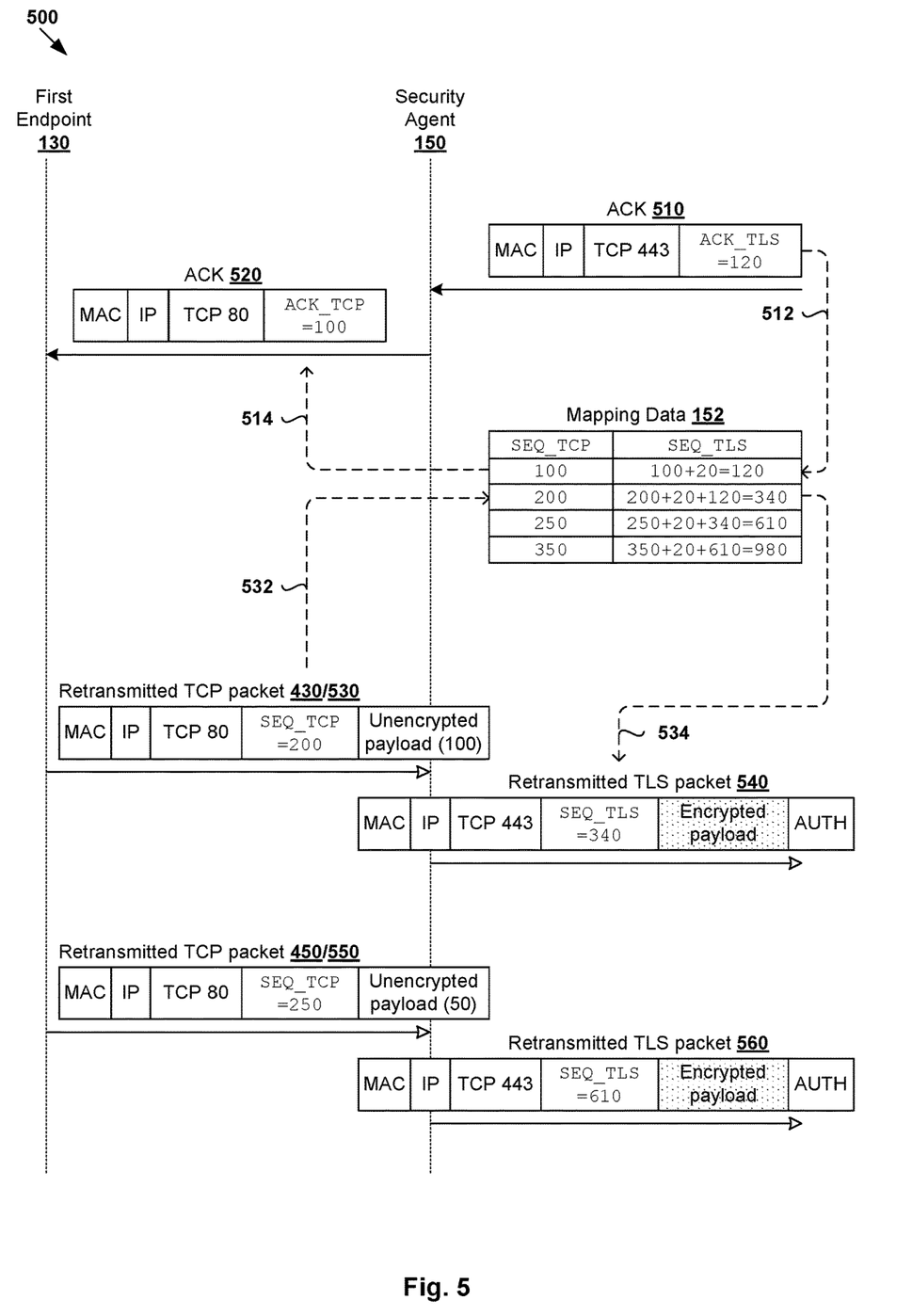
FIG. 5 is a schematic diagram illustrating example packet acknowledgement and retransmission in a network environment.

FIG. 5 is a schematic diagram illustrating example packet acknowledgement and retransmission in network environment 100. Here, consider the case where security agent 150 receives first ACK packet 510 for first TLS packet 420 with SEQ_TLS=120 in FIG. 4. Based on (SEQ_TCP=100, SEQ_TLS=120) in mapping data 152, security agent 150 generates and sends second ACK packet 520 for corresponding first TCP packet 410 with SEQ_TCP=100 in FIG. 4. See also 512, 514 in FIG. 5. Since the data has been acknowledged, security agent 150 may also remove corresponding entry (SEQ_TCP=100, SEQ_TLS=120) from mapping data 152.

Note that ACK packet 510 received by security agent 150 includes an ACK number in the form of ACK_TLS=120, which is the same as SEQ_TLS=120 associated with encrypted data being acknowledged. Similarly, ACK packet 520 sent to VM1 130 includes ACK_TCP=100, which is the same as SEQ_TCP=100. In practice, however, ACK_TLS may deviate from SEQ_TLS by an offset value, such as ACK_TLS=SEQ_TLS+OFFSET-1. Similarly, ACK_TCP and SEQ_TCP may be different, such as ACK_TCP=SEQ_TCP+OFFSET-2. OFFSET-1 and OFFSET-2 may be the same value, or different values.

At 365 and 370, in response to receiving the ACK packet for SEQ_TCP=100, VM1 130 removes the copy of first TCP packet 410 that is temporarily stored at block 325 for retransmission purposes.

Retransmission

Mapping data 152 stored at block 345 in FIG. 3 may be used by security agent 150 to keep track of TCP packets and TLS packets that have been sent, but not yet acknowledged, for retransmission purposes. For example, as shown at 490 and 495 in FIG. 4, respective TLS packets 440, 460 fail to reach second endpoint 160 or an acknowledgement is not received for various reasons, such as network congestion, hardware or software failure, etc. In this case, packet retransmission will be performed. Some examples will be explained using FIG. 3 (see blocks 365, 375-395) and FIG. 5.

At 365 and 375 in FIG. 3, in response to determination that an ACK packet for SEQ_TCP=200 has not been received within a timeout period, VM1 130 retrieves a copy of second TCP packet 430 and retransmits the packet (see 520 in FIG. 5).

At 330, 335 and 380 in FIG. 3, in response to detecting TCP packet 430/530 that includes unencrypted payload data and SEQ_TCP=200, security agent 150 determines that SEQ_TCP=200 is already in mapping data 152 therefore TCP packet 430/530 is a retransmitted TCP packet in FIG. 5. See also corresponding 522, 524.

At 385 and 390, since encrypted data is not stored by security agent 150, TLS processing is performed to generate TLS packet 540 for retransmission. In the example in FIG. 5, TLS packet 540 includes encrypted payload data and SEQ_TLS=340 based on (SEQ_TCP=200, SEQ_TLS=340) retrieved from mapping data 152. See also corresponding 532, 534.

The TLS processing may involve security agent 150 encrypting the unencrypted payload data in retransmitted TCP packet 430/530 in FIG. 5, such as using the first encryption initialization vector (IV1) used at block 340 or a (different) second encryption initialization vector (IV2). If IV2=IV1 is preferred, it is necessary to store a copy of IV1 in mapping data 152. Otherwise, it is not necessary to remember IV1 used for the first transmission. Instead, the current IV may be incremented. At 395, TLS packet 440 with SEQ_TLS=340 is retransmitted to second endpoint 160.

The above may be repeated for another retransmitted TCP packet that has not been acknowledged in FIG. 5. Similarly, after a timeout period expires, VM1 130 (e.g., guest TCP kernel 136) may retransmit TCP packet 450/550 with SEQ_TCP=250. In response to detecting the retransmitted TCP packet 550 in FIG. 5, security agent 150 generates and sends TLS packet 560 that includes encrypted payload data and SEQ_TLS=610 to second endpoint 160.

TLS packet 560 in FIG. 5 is generated based on (SEQ_TCP=250, SEQ_TLS=610) in mapping data 152. Again, depending on the encryption initialization vector used at blocks 340 and 390, the encrypted payload data in TLS packet 560 in FIG. 5 may be different from that in TLS packet 460 having the same SEQ_TLS=610 in FIG. 4. Since it is not necessary for security agent 150 to store any encrypted data for packet retransmission purposes, the size of kernel state/memory may be reduced, thereby improving memory efficiency.

Example In-Kernel Implementation

Figure 6:
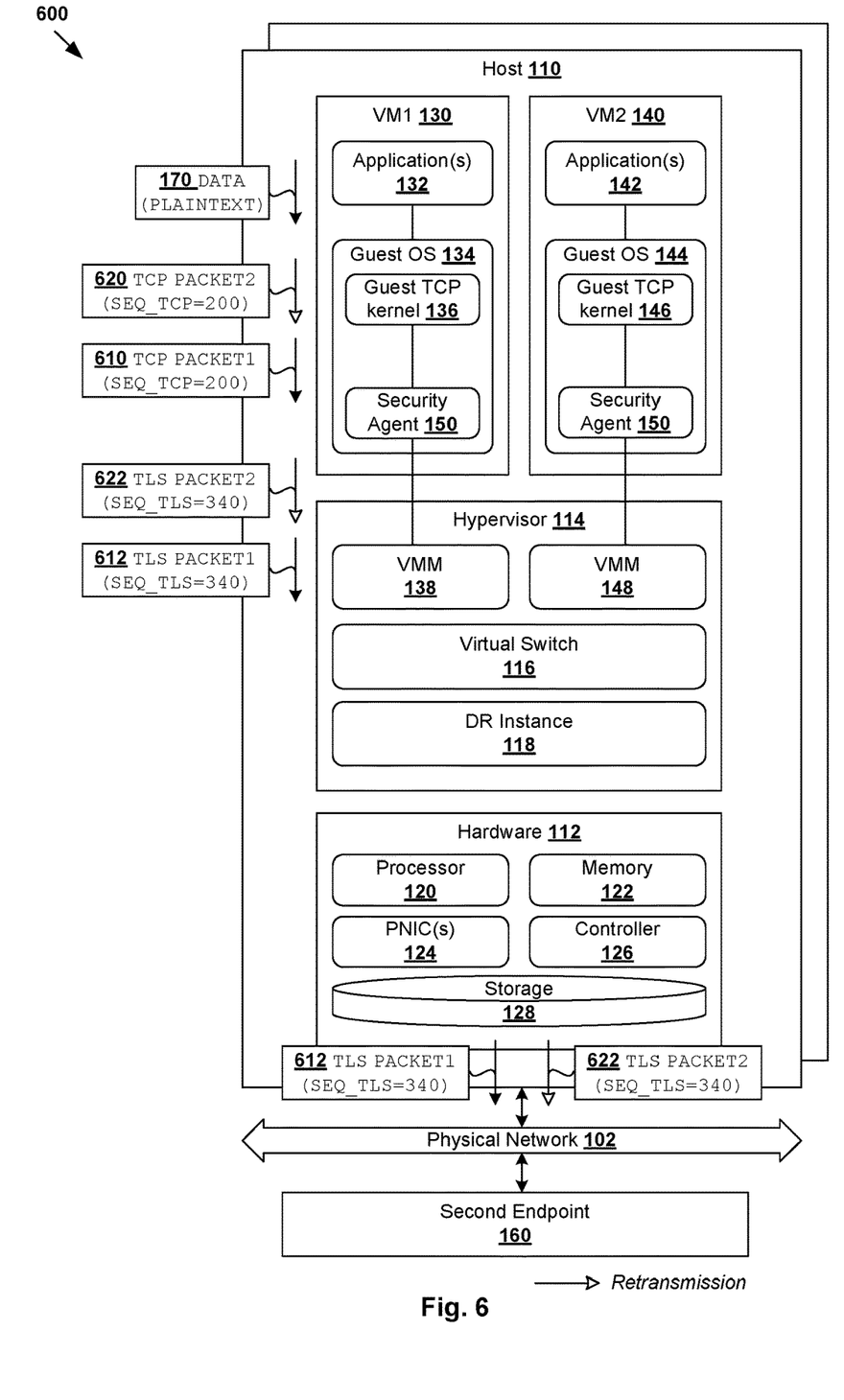
FIG. 6 is a schematic diagram illustrating an example in-kernel implementation of secure communication protocol processing by a virtualized computing instance in a network environment.

FIG. 6 is a schematic diagram illustrating example in-kernel implementation 600 of secure communication protocol processing by virtualized computing instance 130 in network environment 100. Compared to the example in FIG. 1, security agent 150 may be implemented by guest OS 134 of VM1 130 supported by host 110 instead of hypervisor 114. Similar to the example in FIG. 1, security agent 150 in FIG. 6 may be deployed after (i.e., in the egress direction) application 132 and guest TCP kernel 136 to perform secure communication protocol processing according to the examples of the present disclosure.

For example, in response to detecting first TCP packet 610 that includes unencrypted payload data and SEQ_TCP=200, security agent 150 running under guest OS 134 generates and sends first TLS packet 612 that includes encrypted payload data and SEQ_TLS=340. First TCP packet 610 may be generated by guest TCP kernel 136 supported by guest OS 134 of VM1 130 based on data 170 from application 132. In response to detecting second TCP packet 620 that includes SEQ_TCP=200 stored in mapping data 152, security agent 150 handles retransmission by generating and sending second TLS packet 622 that includes encrypted payload data and SEQ_TLS=340. TLS packets 612, 622 are sent to second endpoint 160 via hypervisor 114, physical NIC 124 and physical network 102.

Example Physical NIC Implementation

Figure 7:
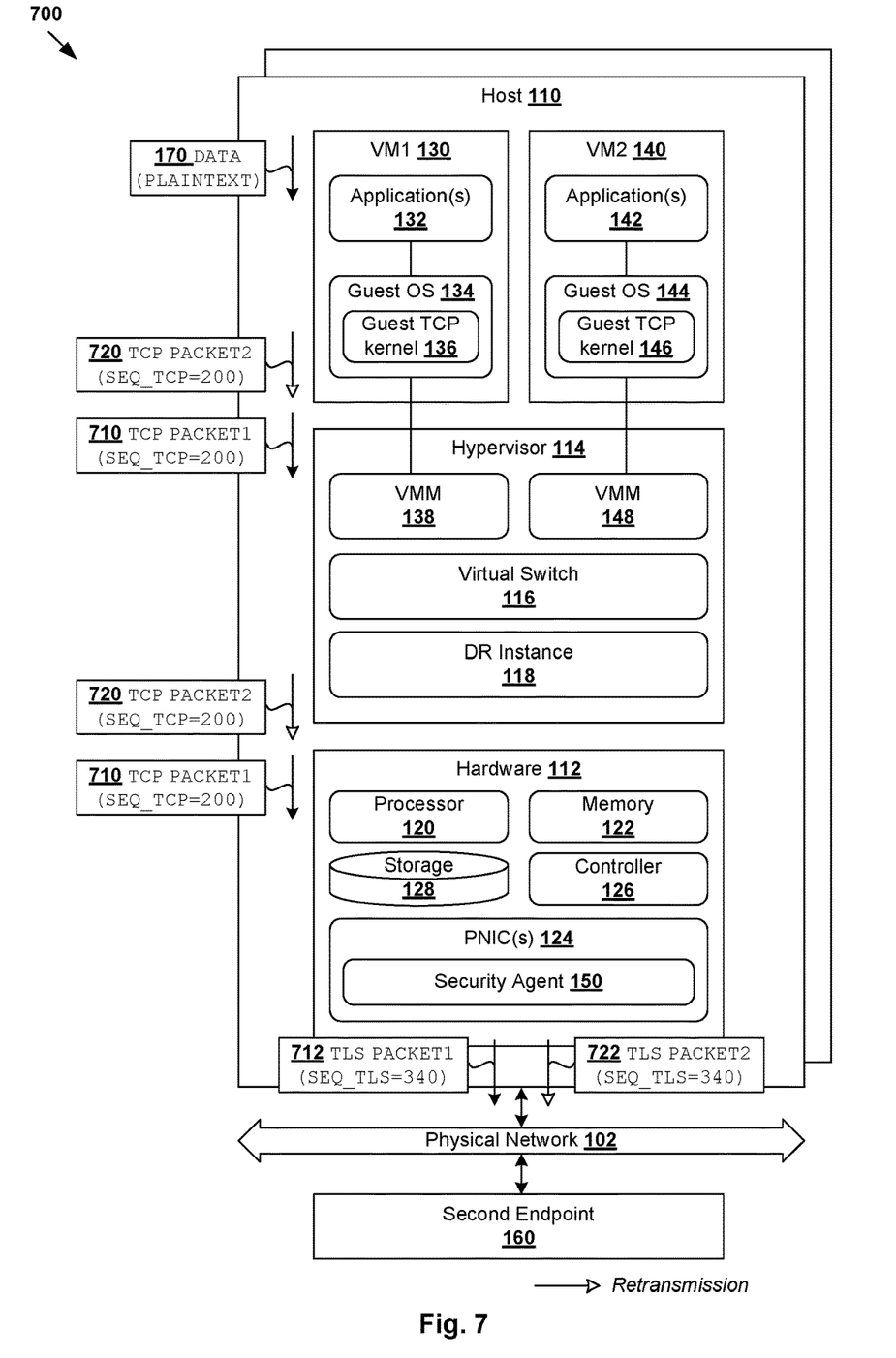
FIG. 7 is a schematic diagram illustrating an example implementation of secure communication protocol processing by a physical network interface controller (NIC) in a network environment.

FIG. 7 is a schematic diagram illustrating example implementation 700 of secure communication protocol processing by physical NIC 124 in network environment 100. Compared to the examples in FIG. 1 and FIG. 6, secure communication protocol processing according to examples of the present disclosure may be offloaded to physical NIC 124 of host 110 supporting first endpoint 130. In this case, security agent 150 may be implemented by physical NIC 124 using software and/or hardware.

In the example in FIG. 7, in response to detecting first TCP packet 710 that includes unencrypted payload data and SEQ_TCP=200, security agent 150 at physical NIC 124 generates and sends first TLS packet 712 that includes encrypted payload data and SEQ_TLS=340. First TCP packet 710 may be generated by guest TCP kernel 136 supported by guest OS 134 of VM1 130 based on data 170 from application 132. In response to detecting second TCP packet 720 that includes SEQ_TCP=200 stored in mapping data 152, security agent 150 at physical NIC 124 handles the retransmission by generating and sending second TLS packet 722 that includes encrypted payload data and SEQ_TLS=340. Once generated, TLS packets 712, 722 are sent to second endpoint 160 via physical network 102.

Example Network Device Implementation

Figure 8:
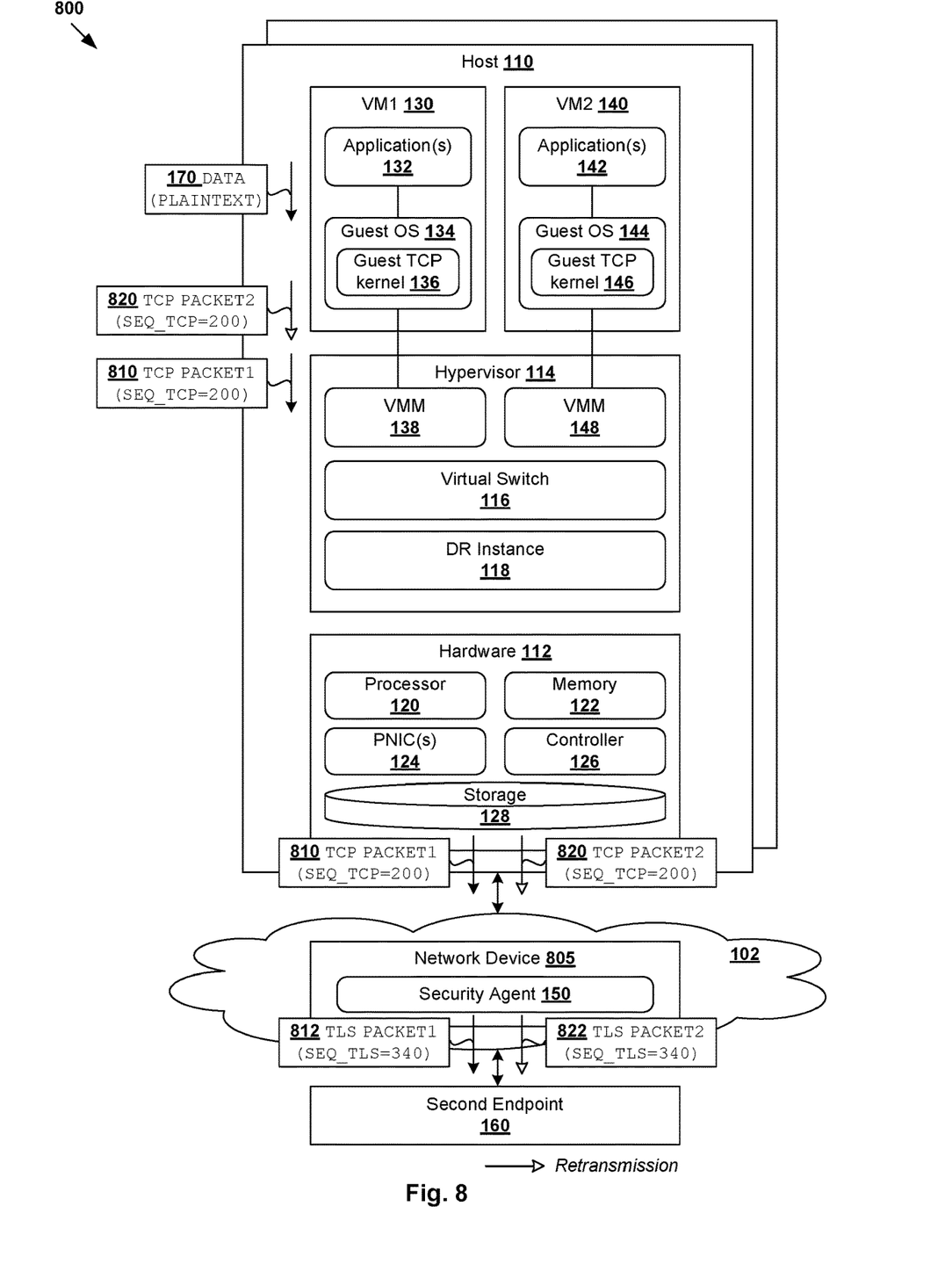
FIG. 8 is a schematic diagram illustrating an example implementation of secure communication protocol processing by a network device in a network environment.

FIG. 8 is a schematic diagram illustrating example implementation 800 of secure communication protocol processing by network device 805 in network environment 100. Compared to the examples in FIG. 1, FIG. 6 and FIG. 7, secure communication protocol processing according to examples of the present disclosure may be offloaded from host 110 supporting first endpoint 130 to network device 805 connecting host 110 with second endpoint 160.

In the example in FIG. 8, in response to detecting first TCP packet 810 that includes unencrypted payload data 170 from application 132 and SEQ_TCP=200, security agent 150 at physical NIC 124 generates and sends first TLS packet 812 that includes encrypted payload data and SEQ_TLS=340. In response to detecting second TCP packet 820 that includes SEQ_TCP=200 stored in mapping data 152, security agent 150 at physical NIC 124 handles the retransmission by generating and sending second TLS packet 822 that includes encrypted payload data and SEQ_TLS=340. Once generated, TLS packets 812, 822 are sent to second endpoint 160 via other network device(s) in physical network 102.

The term "network device" may refer generally to any suitable intermediate device connecting host 110 with second endpoint 160, such as router, switch, gateway, etc. Security agent 150 may be implemented by network device 805 using software and/or hardware. In the example in FIG. 7, the network via which unencrypted TCP packets 810, 820 are sent to network device 805 should be "secure," such as by air-gapping the network from the rest of physical network 802.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, computer system(s) capable of supporting or implementing security agent 150, such as physical host 110, network device 805 or any other system, may be deployed in network environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a security agent to perform secure communication protocol processing in a network environment that includes the security agent, a first endpoint, and a second endpoint, the method comprising:

in response to detecting a first transport protocol packet that is addressed for transmission via a transport layer connection from the first endpoint to the second endpoint, wherein the first transport protocol packet includes unencrypted payload data and a first sequence number:
  (i) based on the first transport protocol packet, generating and sending a first secure communication protocol packet that includes: encrypted payload data that has been encrypted by the security agent from the payload data in the first transport protocol packet, and a second sequence number,
  (ii) wherein the security agent:
    is implemented by a hypervisor of a physical host that supports the first endpoint,
    is deployed along a data path between the first endpoint and a physical network attached to the physical host, and
    does not terminate or re-establish the transport layer connection, and wherein the security agent does not store a copy of the encrypted payload data that was sent; and
  (iii) storing mapping data that associates the first sequence number with the second sequence number; and
in response to receiving, from the first endpoint, a second transport protocol packet that includes the first sequence number:
  (i) based on the mapping data and the first sequence number in the second transport protocol packet, determining that the second transport protocol packet is a retransmission of the first transport protocol packet; and
  (ii) in response to determining that the second transport protocol packet is the retransmission of the first transport protocol packet, generating and sending a second secure communication protocol packet, wherein the second secure communication protocol packet includes the second sequence number associated with the first sequence number, and wherein generating and sending the second secure communication protocol packet includes encrypting unencrypted payload data in the second transport protocol packet to generate encrypted payload data in the second secure communication protocol packet.

2. The method of claim 1, wherein generating and sending the first secure communication protocol packet comprises:
mapping the first sequence number to the second sequence number based on an offset value associated with one or more of: size of a secure communication protocol header in the first secure communication protocol packet, size of an authentication tag in the first secure communication protocol packet, and data padding in the first secure communication protocol packet.

3. The method of claim 1, wherein generating and sending the first secure communication protocol packet comprises:
encrypting the unencrypted payload data in the first transport protocol packet using a first encryption initialization vector to generate the encrypted payload data in the first secure communication protocol packet.

4. The method of claim 3, wherein encrypting the unencrypted payload data in the second transport protocol packet to generate the encrypted payload data in the second secure communication protocol packet includes encrypting the unencrypted payload data in the second transport protocol packet using a second encryption initialization vector that is different from the first encryption initialization vector.

5. The method of claim 1, further comprising:
in response to detecting an acknowledgement packet for the second secure communication protocol packet from the second endpoint, generating and sending an acknowledgement packet for the second transport protocol packet based on the mapping data.

6. A non-transitory computer-readable storage medium that includes instructions which, in response to execution by a processor of a computer system having a security agent, cause the security agent of the computer system to perform a method of secure communication protocol processing in a network environment that includes the computer system, a first endpoint, and a second endpoint, wherein the method comprises:
in response to detecting a first transport protocol packet that is addressed for transmission via a transport layer connection from the first endpoint to the second endpoint, wherein the first transport protocol packet includes unencrypted payload data and a first sequence number:
(i) based on the first transport protocol packet, generating and sending a first secure communication protocol packet that includes: encrypted payload data that has been encrypted by the security agent from the payload data in the first transport protocol packet, and a second sequence number,
(ii) wherein the security agent:
is implemented by a hypervisor of a physical host that supports the first endpoint,
is deployed along a data path between the first endpoint and a physical network attached to the physical host, and
does not terminate or re-establish the transport layer connection, and wherein a copy of the encrypted payload data that was sent is not stored by the security agent; and
(iii) storing mapping data that associates the first sequence number with the second sequence number; and
in response to receiving, from the first endpoint, a second transport protocol packet that includes the first sequence number:
(i) based on the mapping data and the first sequence number in the second transport protocol packet, determining that the second transport protocol packet is a retransmission of the first transport protocol packet; and
(ii) in response to determining that the second transport protocol packet is the retransmission of the first transport protocol packet, generating and sending a second secure communication protocol packet, wherein the second secure communication protocol packet includes the second sequence number associated with the first sequence number, and wherein generating and sending the second secure communication protocol packet includes encrypting unencrypted payload data in the second transport protocol packet to generate encrypted payload data in the second secure communication protocol packet.

7. The non-transitory computer-readable storage medium of claim 6, wherein generating and sending the first secure communication protocol packet comprises:
mapping the first sequence number to the second sequence number based on an offset value associated with one or more of: size of a secure communication protocol header in the first secure communication protocol packet, size of an authentication tag in the first secure communication protocol packet, and data padding in the first secure communication protocol packet.

8. The non-transitory computer-readable storage medium of claim 6, wherein generating and sending the first secure communication protocol packet comprises:
encrypting the unencrypted payload data in the first transport protocol packet using a first encryption initialization vector to generate the encrypted payload data in the first secure communication protocol packet.

9. The non-transitory computer-readable storage medium of claim 8, wherein encrypting the unencrypted payload data in the second transport protocol packet to generate the encrypted payload data in the second secure communication protocol packet includes encrypting the unencrypted payload data in the second transport protocol packet using a second encryption initialization vector that is different from the first encryption initialization vector.

10. The non-transitory computer-readable storage medium of claim 6, wherein the method further comprises:
in response to detecting an acknowledgement packet for the second secure communication protocol packet from the second endpoint, generating and sending an acknowledgement packet for the second transport protocol packet based on the mapping data.

11. A computer system that includes a security agent configured to perform secure communication protocol processing in a network environment that includes the computer system, a first endpoint, and a second endpoint, the computer system comprising:
a processor; and
a non-transitory computer-readable medium having stored thereon instructions that, in response to execution by the processor, cause the security agent to:
in response to detecting a first transport protocol packet that is addressed for transmission via a transport layer connection from the first endpoint to the second endpoint, wherein the first transport protocol packet includes unencrypted payload data and a first sequence number:
(i) based on the first transport protocol packet, generate and send a first secure communication protocol packet that includes: encrypted payload data that has been encrypted by the security agent from the payload data in the first transport protocol packet, and a second sequence number,
(ii) wherein the security agent:
is implemented by a hypervisor of a physical host that supports the first endpoint,
is deployed along a data path between the first endpoint and a physical network attached to the physical host, and
does not terminate or re-establish the transport layer connection, and wherein a copy of the encrypted payload data that was sent is not stored by the security agent; and
(iii) store mapping data that associates the first sequence number with the second sequence number; and
in response to receiving, from the first endpoint, a second transport protocol packet that includes the first sequence number:
(i) based on the mapping data and the first sequence number in the second transport protocol packet, determine that the second transport protocol packet is a retransmission of the first transport protocol packet; and (ii) in response to determination that the second transport protocol packet is the retransmission of the first transport protocol packet, generate and send a second secure communication protocol packet, wherein the second secure communication protocol packet includes the second sequence number associated with the first sequence number, wherein the instructions to cause the security agent to generate and send the second secure communication protocol packet include instructions to cause the security agent to encrypt unencrypted payload data in the second transport protocol packet to generate encrypted payload data in the second secure communication protocol packet.

12. The computer system of claim 11, wherein the instructions to cause the security agent to generate and send the first secure communication protocol packet cause the security agent to:
   map the first sequence number to the second sequence number based on an offset value associated with one or more of: size of a secure communication protocol header in the first secure communication protocol packet, size of an authentication tag in the first secure communication protocol packet, and data padding in the first secure communication protocol packet.

13. The computer system of claim 11, wherein the instructions to cause the security agent to generate and send the first secure communication protocol packet cause the security agent to:
   encrypt the unencrypted payload data in the first transport protocol packet using a first encryption initialization vector to generate the encrypted payload data in the first secure communication protocol packet.

14. The computer system of claim 13, wherein the instructions to cause the security agent to encrypt the unencrypted payload data in the second transport protocol packet to generate the encrypted payload data in the second secure communication protocol packet include instructions to cause the security agent to encrypt the unencrypted payload data in the second transport protocol packet using a second encryption initialization vector that is different from the first encryption initialization vector.

15. The computer system of claim 11, wherein the instructions further cause the security agent to:
   in response to detecting an acknowledgement packet for the second secure communication protocol packet from the second endpoint, generate and send an acknowledgement packet for the second transport protocol packet based on the mapping data.

16. The computer system of claim 11, wherein the security agent is implemented in a physical network interface controller (NIC) of the physical host that supports the first endpoint.

17. The method of claim 1, wherein the security agent is implemented in a physical network interface controller (NIC) of the physical host that supports the first endpoint.

18. The non-transitory computer-readable storage medium of claim 6, wherein the security agent is implemented in a physical network interface controller (NIC) of the physical host that supports the first endpoint.

\* \* \* \* \*